United States Patent

Poludetkin et al.

[15] 3,638,513
[45] Feb. 1, 1972

[54] INDEXING ATTACHMENTS USED IN MACHINES FOR SHARPENING MULTIPOINT TOOLS

[72] Inventors: Vladimir Romanovich Poludetkin, ulitsa I Smolenskaya, 8, Korpus 4, kv. 93; Iosif Donatovich Menitsky, ulitsa Pravdy, 49, kv. 60; Jury Abramovich Kaplan, ulitsa Zhestkova, 21, kv. 4, all of Bitebsk, U.S.S.R.

[22] Filed: Sept. 4, 1970

[21] Appl. No.: 69,611

[30] Foreign Application Priority Data

Oct. 19, 1969 U.S.S.R..................................1374231

[52] U.S. Cl..............................................................74/820
[51] Int. Cl.............................................................B23b 29/32
[58] Field of Search .......................................74/820, 827, 84

[56] References Cited

UNITED STATES PATENTS 1,985,477  12/1934  Wolf.......................................74/820 X
2,618,841  11/1952  Bechler.................................74/820 UX

*Primary Examiner*—William F. O'Dea
*Assistant Examiner*—F. D. Shoemaker
*Attorney*—Holman and Stern

[57] ABSTRACT

The invention relates to indexing attachments in multipoint tool-sharpening machines.

The indexing attachment according to the invention is characterized in that the index plate is turned through the angle of indexing by means of a driving Geneva motion, which is kinematically connected with the index plate through a four-link crank-and-rocker mechanism.

The indexing attachment is intended mainly for use in hob-sharpening machines.

1 Claims, 1 Drawing Figure

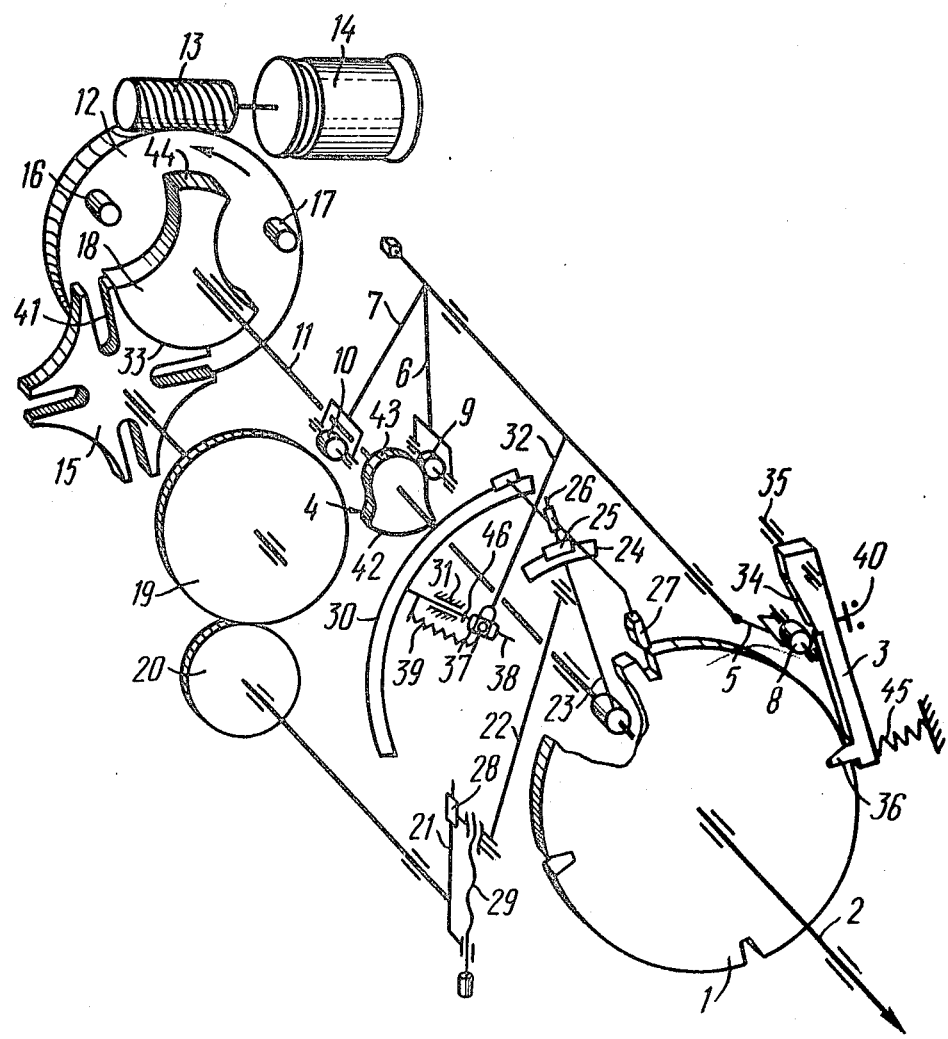

INDEXING ATTACHMENTS USED IN MACHINES FOR SHARPENING MULTIPOINT TOOLS

The invention relates to machine tools, and more precisely to indexing attachments used in machines for sharpening multipoint tools.

The proposed indexing attachment can be most advantageously employed in hob-sharpening machines.

Widely known in the art are indexing attachments to multipoint-tool-sharpening machines, wherein the index plate rigidly fixed on an arbor carrying the tool to be sharpened, interacts with the index holding it. The cam operating the index is fixed on a driving distribution shaft located coaxially with the arbor, and rotated by a worm wheel rigidly fixed thereon. At the moment of indexing this worm wheel drives a Geneva motion engaged therewith, which through a change-gear quadrant turns the index plate to the angle of indexing.

Noted among the disadvantages of these indexing attachments should be the fact that in order to obtain therein any desirable number of divisions, an accordingly large number of change gears or changeable parts of the Geneva mechanism is required, which complicates the setting of the indexing attachment, while the need to make a large number of change parts renders it labor consuming and costly in production.

An object of the present invention is to provide an indexing attachment, that would make possible any number of indexings to be realized without changing gears, or parts of the Geneva mechanism.

Another object of the present invention is to provide an indexing attachment, that would be convenient in setting it, and not consuming much labor in its production.

With these and other objects in view, communication of the Geneva mechanism with the index plate is, according to the invention, realized by means of a four-link crank-and-rocker motion, whose crank, adjustable in length, is connected with the Geneva mechanism through a pair of gears, while the rocker engaged with the crank by a connecting rod and freely seated on the distributing shaft, carries a second index turning the index plate, and moving both in the radial direction and along the guide of a circular segment, which segment, in turn, moves along fixed guides radially located with respect to the index plate, and is through a system of levers connected with the cam of the first index.

Other objects and advantages of the invention will become apparent from the following detailed description of an exemplary embodiment of the invention, and the appended drawing which shows the schematic diagram of the indexing attachment to the hob-sharpening machine.

The indexing attachment comprises a changeable index plate 1 rigidly fixed on one end of arbor 2 whose other end carries the tool to be sharpened (not shown).

The index plate 1 has a number of recesses according to the number of teeth in the tool to be sharpened, entering which recesses is the (first) main springed index 3 serving to hold plate 1, and communicating with a cam 4 that operates it, through levers 5, 6 and 7, on whose ends rollers 8, 9 and 10, respectively, are mounted.

The actuating cam 4 is rigidly fixed on a distribution shaft 11 disposed coaxially with arbor 2. Rigidly secured on the same shaft 11 is a worm wheel 12 rotated by a worm 13 fixed on the shaft of an electric motor 14.

Engaged with the worm wheel 12 is a Geneva mechanism, comprising a Geneva cross 15 which interacts with pins 16 and 17, with a guide 18 that are fixed on the face of the worm wheel 12.

The Geneva cross 15 through two spur gears 19 and 20 having a gear ratio of 2:1, is connected with a four-link crank-and-rocker mechanism comprising a crank 21 adjustable in length, a connecting rod 22, and a rocker arm 23 freely seated on the distribution shaft 11. Fixed on rocker 23 are circular guides 24, whereon mounted is a slide 25 carrying a bar 26 radially disposed with respect to the index plate 1, secured on which bar is (the second) index 27 serving to turn plate 1. To adjust the length of crank 21, made thereon are radial guides along which there moves a slide 28 connected with an adjustment screw 29, and engaged with the connecting rod 22. Index 27, rotating plate 1 is radially movable with respect to the index plate and can as well move along the guide of a circular segment 30. This segment 30 can, in turn, move along fixed guides 31 radially disposed relative to the index plate 1, and it is connected with cam 4 through a system of levers 32, 5, 6 and 7, that are rigidly fixed to each other.

The indexing attachment works as follows.

The indexing cycle is completed within one revolution of the distribution shaft 11, and it starts at the moment the actuating element of the machine, say, the table, the grinding head, etc., (not shown), in the course of its movement engages the arrangement that passes a signal to energize the electric motor 14. In the beginning of the cycle, with the rotation of the distribution shaft 11 the cylindrical part 33 of guide 18 slides against the cylindrical recess of the Geneva cross 15, so that the latter does not rotate. At this time cam 4 interacts with roller 9 of lever 6 and turns the system of levers 6-7-5-32 anticlockwise. Roller 5 of lever 5 engages a bevel surface 34 of index 3 turning the latter anticlockwise about an axle 35, a tooth 36 of index 3 coming out from the recess of the index plate 1 and thus releasing the latter. At the same time, with the turn of lever 32 a slide 37 moves rightwards (as in the drawing) along a rod 38. Under the action of a spring 39 the guiding segment 30 also moves rightwards toward the center, and moving together therewith towards the center, along the guide bar 26, is index 27 as well, which enters the opposite lying recess of the index plate 1.

After the distribution shaft 11 turns through a certain angle, roller 9 will come to the highest point of the profile of cam 4, index 27 at this time being in the recess of the index plate 1, and index 3 being withdrawn from the recess of the index plate 1. The end switch 40 is pressed down, the cylindrical part 33 of guide 18 will let the Geneva cross 15 free, and pin 16 will shift to the start of a slot 41 of the Geneva cross 15.

During the further rotation of the distribution shaft 11 pin 16 turns the Geneva cross 15 through 90°. Rotation of the Geneva cross 15 is through gears 19–20 having a gear ratio of 2:1 transmitted to crank 21. Within this time crank 21 will make half a revolution, and rocker 23 will make one rocking anticlockwise. Slide 25 is rigidly fixed on segment 24, owing to which index 27 moves along the guiding segment 30 entraining the index plate 1 and thus turning it together with arbor 2 to the required angle of indexing, and bringing the respective recess of plate 1 to under tooth 36 of index 3.

At the time of indexing roller 9 of lever 6 contacts a cylindrical section 42 of cam 4, while roller 10 of lever 7 contacts a cylindrical section 43 of the same cam 4, levers 7, 6, 5, 32 now remaining at rest.

After the Geneva cross turns through 90°, pin 16 with further rotation of the distribution shaft 11 disengages slot 41. The Geneva cross 15 is withheld from rotation by a cylindrical section 44 of guide 18, and crank 21 stops. The rising curve of cam 4 interacts with roller 10, and its descending curve with roller 9. The system of levers 7-6-5-32 turns clockwise. Lever 5 releases index 3 whose tooth 36 under the action of a spring 45 drops into the recess of the index plate 1, the end switch 40 being set free. Lever 32 through a stop 46 moves the guiding segment 30 leftwards and withdraws index 27 from the recess of the index plate 1.

As soon as the index plate 1 is locked, and the rotating index 27 withdrawn, the Geneva cross 15 gets free, pin 17 enters the next slot of cross 15, and turns it through 90°. Within this time crank 21 makes half a revolution more, rocker 23 makes one rocking clockwise into its initial position, and index 27 stops opposite the next recess of the index plate 1.

What we claim is:

1. An indexing attachment to multipoint-tool-sharpening machines, comprising: an arbor carrying the tool to be sharpened; a changeable index plate rigidly fixed on said arbor; a first index holding said index plate; a distribution shaft disposed coaxially with said arbor, and carrying a cam operating said first index through a system of levers; a worm wheel rigidly fixed on said distribution shaft, and capable of rotating together therewith; a Geneva mechanism driven by said worm wheel at the moment of indexing; a crank, adjustable in length and connected with said Geneva mechanism through a pair of gears; a rocker freely mounted on said distribution shaft, and engaged with said crank by a connecting rod; a second index secured on said rocker so as to be capable of radial movement with respect to said index plate, and rotating said plate to the angle of indexing; a circular segment capable of moving along fixed guides radially disposed with regard to said index plate, this segment being connected with said cam through a system of levers, and also having a guide wherealong said second index moves.

* * * * *